(12) United States Patent
Tanase et al.

(10) Patent No.: US 6,616,179 B2
(45) Date of Patent: Sep. 9, 2003

(54) AIR BAG IN USE FOR HEAD PROTECTION AIR BAG DEVICE

(75) Inventors: Toshinori Tanase, Aichi (JP); Choko Tanabe, Aichi (JP); Mitsuyoshi Ohno, Anjyo (JP); Norio Urushi, Toyota (JP)

(73) Assignees: Toyoda Gosei Co., Ltd., Aichi-ken (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/916,107

(22) Filed: Jul. 27, 2001

(65) Prior Publication Data

US 2002/0020991 A1 Feb. 21, 2002

(30) Foreign Application Priority Data

Jul. 31, 2000 (JP) .................................... 2000-232201

(51) Int. Cl.$^7$ ............................................... B60R 21/22
(52) U.S. Cl. .............................. 280/730.2; 280/743.1
(58) Field of Search ......................... 280/730.2, 743.1, 280/729, 728.1

(56) References Cited

U.S. PATENT DOCUMENTS

| | | | | |
|---|---|---|---|---|
| 5,899,491 A | * | 5/1999 | Tschaeschke | 280/730.2 |
| 6,168,191 B1 | * | 1/2001 | Webber et al. | 280/730.2 |
| 6,220,625 B1 | * | 4/2001 | Wallner et al. | 280/730.2 |
| 6,250,667 B1 | * | 6/2001 | Wallner | 280/730.2 |
| 6,367,836 B1 | * | 4/2002 | Tanase et al. | 280/730.2 |
| 6,386,581 B1 | * | 5/2002 | Ohno | 280/735 |
| 6,394,487 B1 | * | 5/2002 | Heudorfer et al. | 280/729 |
| 6,409,211 B1 | * | 6/2002 | Sheng et al. | 280/730.2 |
| 6,431,587 B1 | * | 8/2002 | O'Docherty | 280/730.2 |
| 6,460,879 B2 | * | 10/2002 | Tanase et al. | 280/730.2 |

FOREIGN PATENT DOCUMENTS

| | | |
|---|---|---|
| DE | 298 06 200 | 10/1998 |
| GB | 2 324 068 A | 10/1998 |
| JP | 10-138858 | 5/1998 |

* cited by examiner

*Primary Examiner*—Paul N. Dickson
*Assistant Examiner*—David R. Dunn
(74) *Attorney, Agent, or Firm*—Posz & Bethards, PLC

(57) ABSTRACT

An air bag is stored in the upper fringe of the openings on the cabin-inside side, while being folded. The air bag includes a gas inflow part for flowing inflation gas into the air bag, and a main body that inflates when receiving the inflation gas. The main body includes front- and rear-seat inflation chambers, and a gas passage extending forwardly from the gas inflow part and allowing the inflation gas to flow from inflow ports opened in the upper parts of the front- and rear-seat inflation chambers to the front- and rear-seat inflation chambers per se. The inflow port of the rear-seat inflation chamber is opened in a direction substantially orthogonal to an axial direction of the gas passage. A front-side peripheral edge is disposed to be higher than a rear-side peripheral edge.

14 Claims, 7 Drawing Sheets

AIR BAG IN USE FOR HEAD PROTECTION AIR BAG DEVICE

BACKGROUND OF THE INVENTION

1. Field of the Invention

The present invention relates to an air bag in use for a head protection air bag device. More particularly, the invention relates to an air bag which, while being folded, is stored in the upper fringe of the openings on the cabin-inside side, and develops and inflates to cover the openings when receiving the inflation gas, and includes front- and rear-seat inflation chambers located at positions near the sides of front and rear seats.

The present application is based on Japanese Patent Application No. 2000-232201, which is incorporated herein by reference.

2. Description of the Related Art

A conventional head protection air bag device is constructed with an air bag and an inflator of the cylinder type for supplying inflation gas to the air bag (DE 29806200 U1 and GB 2324068, and the like).

The air bag, while being folded, is stored in the upper fringe of the openings on the cabin-inside side, and develops and inflates to cover the openings when receiving the inflation gas, and includes front- and rear-seat inflation chambers respectively located at positions near the sides of front and rear seats.

The air bag includes a gas inflow part which is located at the rear upper part and coupled to an inflator so as to flow inflation gas from the rear side into the air bag per se, and a main body including a front-seat inflation chamber and a rear-seat inflation chamber, and develops and inflates to cover the openings when receiving the inflation gas.

In addition to the front- and rear-seat inflation chambers, the air bag further includes a gas passage extending forwardly from the gas inflow part and being disposed above the front- and rear-seat inflation chambers and allowing the inflation gas to flow from inflow ports opened in the upper parts of the front- and rear-seat inflation chambers to the front- and rear-seat inflation chambers per se.

In the conventional head protection air bag device, the gas passage is extended forwardly from the gas inflow part linearly and substantially horizontally.

With this, the gas passage is filled, to a certain extent, with inflation gas over its entire length, and then the inflation gas flows into the front- and rear-seat inflation chambers via inflow ports associated therewith. There is room for improvement in quickly start the developing and inflating of the folded front- and rear-seat inflation chambers below.

In particular above the rear-seat inflation chamber, the inflation gas flowing forward through the gas passage is strong. Accordingly, in the initial stage of the passage of the inflation gas, inflation gas sometimes is hard to flow into the rear-side peripheral edge. Accordingly, there is room for improvement in securing a quick start of the downward developing/inflating operation.

A possible measure taken for this is to change the gas flowing passage so as to end the developing/inflating operation of the rear-seat inflation chamber and to develop and inflate the front-seat inflation chamber. This measure, however, further delays the ending of the developing/inflating operation of the front-seat inflation chamber which is likely to delay its developing/inflating operation, because the front-seat inflation chamber is remote from the gas inflow part.

SUMMARY OF THE INVENTION

Accordingly, an object of the present invention is to provide an air bag in use for a head protection air bag device which lessens a delay of the ending of a developing/inflating operation of a front-seat inflation chamber, and quickly starts a developing/inflating operation of a rear-seat inflation chamber.

To achieve the above object, there is provided an air bag in use for a head protection air bag device in which the air bag, while being folded, is stored in the upper fringe of the openings on the cabin-inside side, and includes a gas inflow part, located at the rear upper part, for flowing inflation gas into the air bag and a main body which develops and inflates to cover the openings when receiving the inflation gas, the main body including front- and rear-seat inflation chambers, located at positions near the sides of front and rear seats, for receiving inflation gas, and a gas passage extending forwardly from the gas inflow part and being disposed above the front- and rear-seat inflation chambers and allowing the inflation gas to flow from inflow ports opened in the upper parts of the front- and rear-seat inflation chambers to the front- and rear-seat inflation chambers per Se. The air bag is improved such that the inflow port of the rear-seat inflation chamber is opened in a direction substantially orthogonal to an axial direction of the gas passage, and a front-side peripheral edge is disposed to be higher than a rear-side peripheral edge.

The air bag thus constructed may have such a preferable construction that a plurality of inflow ports of the front-seat inflation chamber are opened in a direction substantially orthogonal to an axial direction of the gas passage, while being arrayed along the gas passage, and a guide is formed on the peripheral wall of the gas passage located above the plurality of inflow ports for the front-seat inflation chamber, and directs downwardly part of the inflation gas flowing forwardly and guides the inflation gas from the inflow port of the rear-seat inflation chamber into the front-seat inflation chamber.

In the air bag thus constructed, inflation gas flows from the gas inflow part into the main body. Then, the inflation gas passes through the gas passage extending forwardly and flows forwardly. As recalled, the inflow port of the rear-seat inflation chamber is opened in a direction substantially orthogonal to an axial direction of the gas passage, and a front-side peripheral edge is disposed to be higher than a rear-side peripheral edge. Accordingly, the front-side peripheral edge of the inflow port is easy to interfere with the inflation gas by an extent corresponding to the dimension by which the front-side peripheral edge is higher than the rear-side peripheral edge. The front-side peripheral edge directs the inflation gas resulting from the interference to the rear-seat inflation chamber. This leads to a quick start of the developing/inflating operation of the rear-seat inflation chamber.

The inflow port of the rear-seat inflation chamber has merely such a configuration that it is opened in the direction substantially orthogonal to the axial direction of the gas passage, and its front-side peripheral edge is higher than its rear-side peripheral edge. Such a configuration of the inflow port cannot direct the entire inflation gas flowing forwardly within the gas passage to the rear-seat inflation chamber, as a matter of course. Therefore, a delay of the ending of the developing/inflating operation of the front-seat inflation chamber may be minimized by appropriately adjusting a height of the front-side peripheral edge from the rear-side peripheral edge.

Accordingly, the air bag of the embodiment which is used for the head protection air bag device is capable of minimizing the delay of the ending of the developing/inflating operation of the front-seat inflation chamber, and quickly starts the developing/inflating operation of the rear-seat inflation chamber.

Where the air bag has the preferable construction as stated above, the developing/inflating operation of the front-seat inflation chamber is also quickly started.

The inflation gas flows forwardly through the rear passage above the front-seat inflation chamber and flows to the upper part of the front-seat inflation chamber. As recalled, the guide is formed on the peripheral wall of the gas passage located above the plurality of inflow ports for the front-seat inflation chamber. Therefore, part of the inflation gas flowing forwardly is directed downwardly by the guide, and guided into the front-seat inflation chamber, from the inflow port on the rear side. As a result, the developing/inflating operation of the front-seat inflation chamber is quickly started.

Also in this case, the inflation gas may smoothly be introduced from the inflow ports into the front-seat inflation chamber on the front side of the inflow port by appropriately adjusting the downward projection quantity of the guide, as a matter of course. As a result, the front-seat inflation chamber being folded is developed downward from the substantially entire region as viewed in the front/rear direction. This leads to quicken the ending of the developing/inflating operation of the front-seat inflation chamber.

Features and advantages of the invention will be evident from the following detailed description of the preferred embodiments described in conjunction with the attached drawings.

DETAILED DESCRIPTION OF THE PREFERRED EMBODIMENTS

An embodiment of the present invention will be described with reference to the accompanying drawings.

An air bag 11 of the embodiments is used for a head protection air bag device M. The air bag 11, while being folded, is stored in a region including the lower fringe of a front pillar FP, the lower fringe of the roof side rail RR, and the upper side of a rear pillar RP, as shown in FIG. 1.

The head protection air bag device M is made up of an air bag 11, an inflator 51, mounting brackets 46 to 48, 52, and an air bag cover 9.

Figure 1:
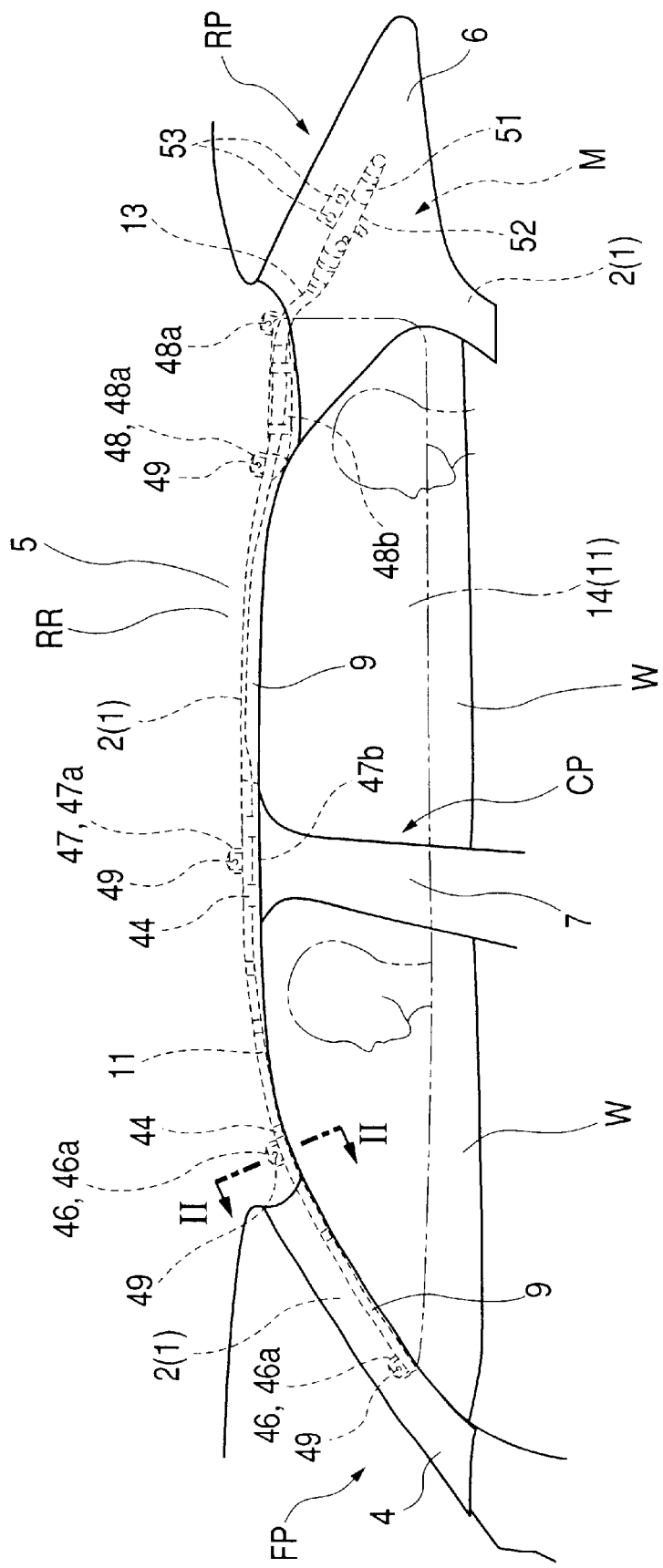
FIG. 1 is a front view showing a head protection air bag device into which an air bag forming an embodiment of the present invention is incorporated, the view being taken from the cabin inside.

The inflator 51, as shown in FIG. 1, takes the form of a cylinder that supplies gas for inflation to the folded air bag 11. Gas-inflow parts 13 (to be described later) are attached to the air bag 11.

The mounting bracket 52 is formed with a metal sheet, and holds down from the outer peripheral side the inflator 51 to which the gas-inflow parts 13 of the air bag 11 are attached, for each gas-inflow part 13. The mounting bracket is mounted on a sheet metal inner panel 2 of a vehicle body 1 on the indoor side of the rear pillar RP.

Figure 2:
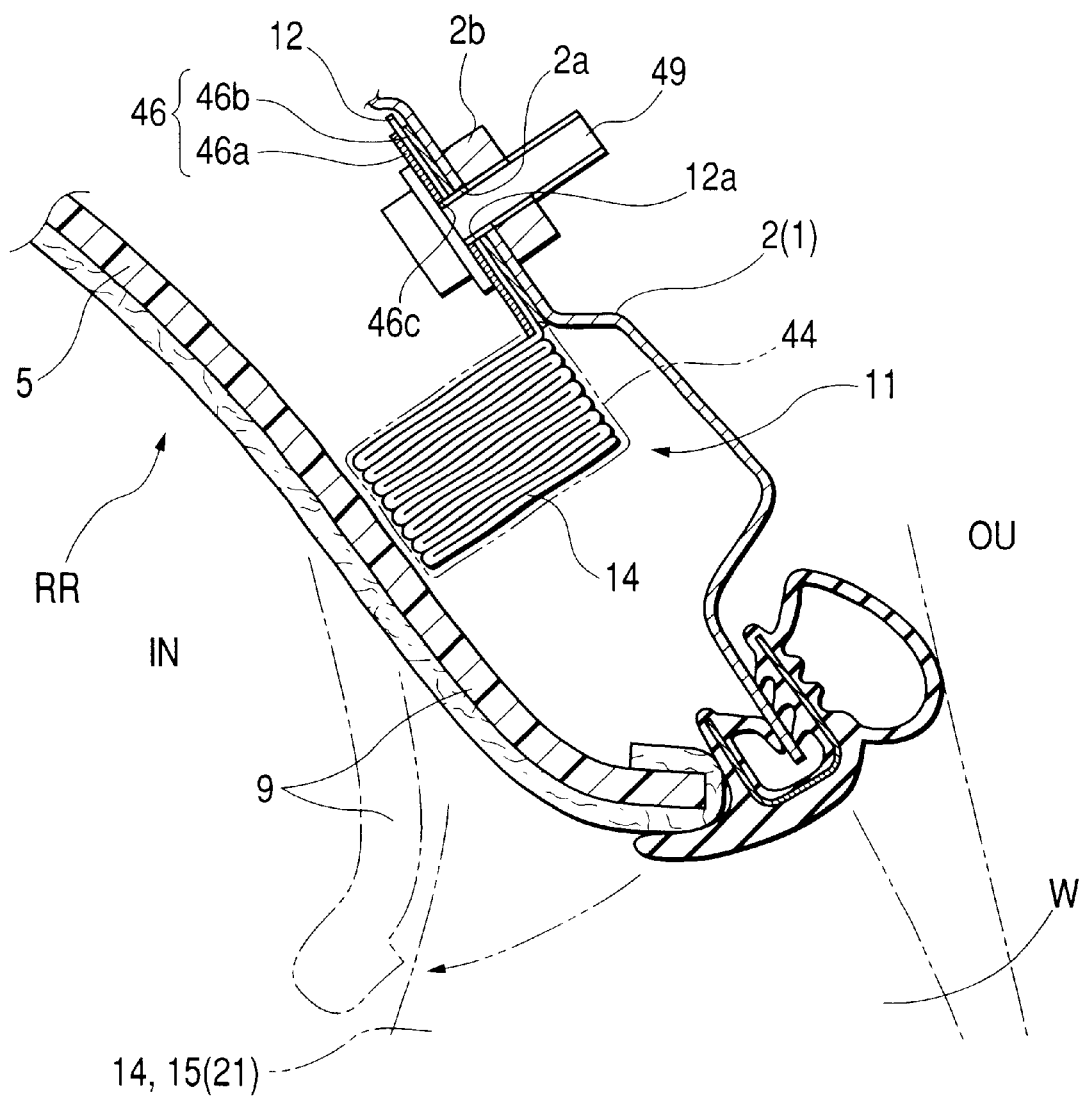
FIG. 2 is an enlarged, longitudinal sectional view taken on line II—II in FIG. 1.

As shown in FIGS. 1 and 2, the mounting bracket 46 formed with a metal sheet sandwiches two mounting parts 12 to be described later. The mounting bracket 46 includes an inner plate 46a on the cabin inside IN and an outer plate 46b on the cabin outside OU. Mount holes 46c are through formed in those inner and outer plates 46a and 46b, while corresponding to a mounting hole of each mounting part 12. The mounting parts 12 are mounted on the inner panel 2 in a manner that mount bolts 49 are inserted into mount holes 12a and 46c, and screwed into a nut 2b fastened to the circumferential edge of a mount hole 2a of the inner panel 2.

As shown in FIG. 1, the mounting bracket 47 formed with a metal sheet sandwiches a mounting part 12, which is located at a mid position of the air bag 11 as viewed in the front/rear direction. It includes an inner plate 47a that is located on the cabin inside like the inner plate 46a of the mounting bracket 46, and an outer plate 47b located on the cabin outside. The outer plate 47b supports a cabin-outside surface and an upper surface of the folded air bag 11, and is L-V shaped in cross section so as to prevent it from entering the cabin outside of a garnish 6 of the rear pillar RP when the air bag 11 is developed and inflated. Mount holes (not attached with reference numeral) through which a mount bolt 49 will be inserted are formed in the inner and outer plates 47a and 47b at a position corresponding to the mount hole 12a of the mounting part 12.

As shown in FIG. 1, the mounting bracket 48 formed with a metal sheet sandwiches two mounting parts 12, which are located at a rear position of the air bag 11. It includes two inner plates 48a that are located on the cabin inside like the inner plate 46a of the mounting bracket 46, and one outer plate 48b located on the cabin outside of the two inner plates 48a. The outer plate 48b also supports a cabin-outside surface and a lower surface of the folded air bag 11 like the outer plate 47b of the mounting bracket 47. And, it is L-shaped in cross section so as to prevent it from entering the cabin outside of the garnish 6 of the rear pillar RP when the air bag 11 is developed and inflated. Mount holes (not attached with reference numeral) through which a mount bolt 49 will be inserted are formed also in the inner and outer plates 48a and 48b at a position corresponding to the mount hole 12a of the mounting part 12.

The air bag cover 9, as shown in FIGS. 1 and 2, is defined by the lower fringes of a pillar garnish 4 located on the front pillar FP and a lower fringe of a roof head lining 5 located on the roof side rail RR. The pillar garnish 4 and the roof head lining 5 are made of synthetic resin, and are secured to the inner panel 2 of the vehicle body 1, which is located on the indoor side of the front pillar FP and the roof side rail RR.

Figure 3:
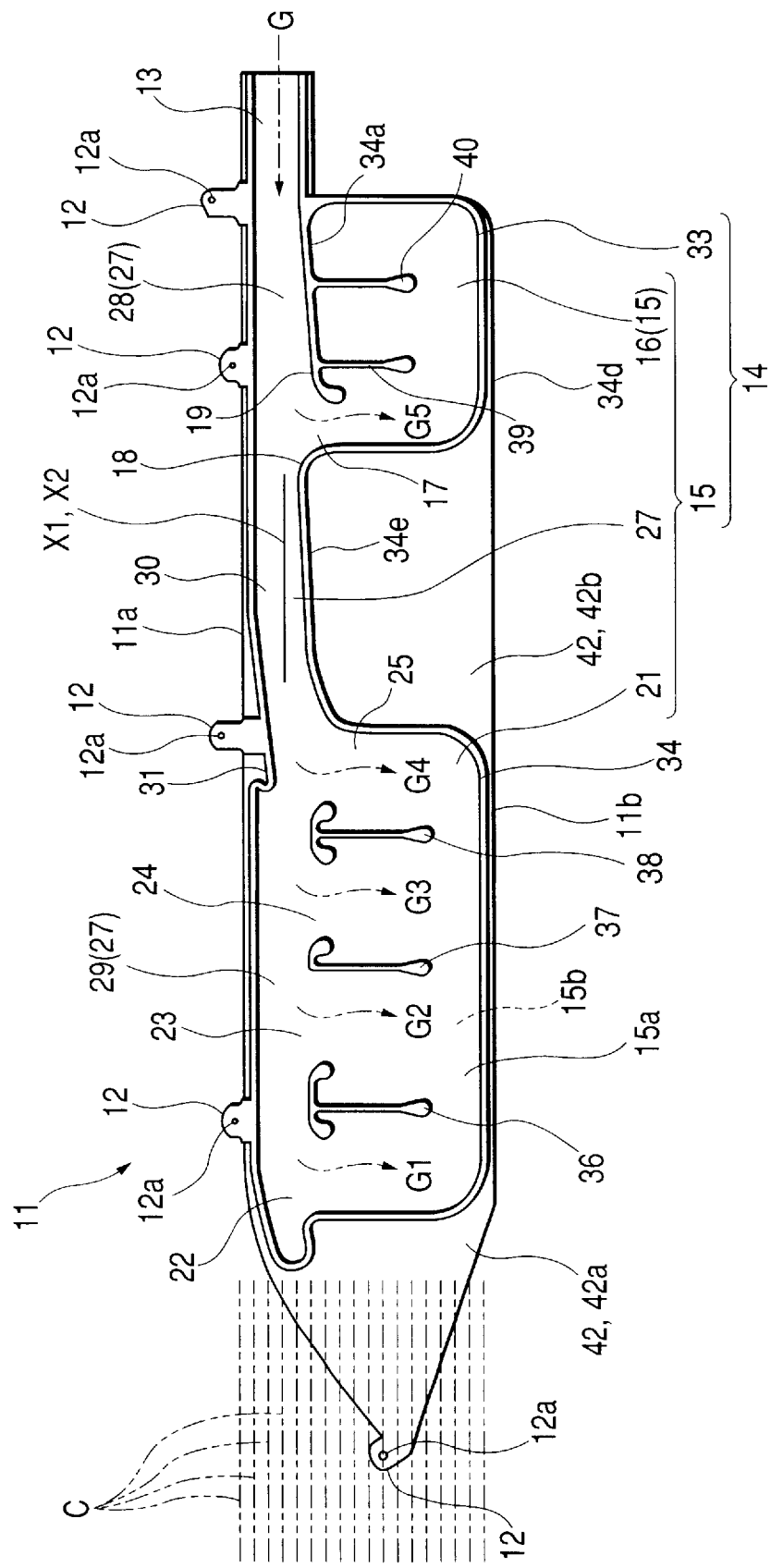
FIG. 3 is a front view showing an air bag being developed flat which is the embodiment.

The air bag 11 is hollow woven by using polyamide and polyester threads. As shown in FIGS. 1 and 3, the inflation section 15 includes a main body 14, a gas inflow part 13, and a plurality of mounting parts 12. The main body 14 receives gas for inflation from the inflator 51, and develops the folded air bag into an inflated one to cover the opening W. The gas-inflow parts 13 introduces the inflation gas from the inflator 51 to the main body 14. The mounting parts 12 are provided on the upper edge 11a of the main body 14.

The gas inflow part 13 is disposed to project to the rear end of the main body 14, and is cylindrical in shape so that it may be applied to the inflator 51.

The plurality of mounting parts 12 are disposed projecting above a peripheral edge part 34 on the upper edge 11a side of the main body 14 and a plate-like member 42, which will be described later. The mounting brackets 46, 47 and 48 used for the mount on the inner panel 2 are secured to the mounting parts 12. The mount holes 12a through which the mount bolt 49 will be inserted are formed in the mounting parts 12.

The main body 14 is constructed with an inflating section 15 which communicates with the gas-inflow parts 13, receives the inflation gas, and inflates to separate a cabin-inside side wall 15a (see FIGS. 3, 4, 5) from a cabin-outside side wall 15b, and a non-inflating section 33 which rejects the incoming gas for inflation.

The inflating section 15 is constructed with a rear-seat inflation chamber 16, a front-seat inflation chamber 21, and a gas passage 27. The rear-seat inflation chamber 16 may be arranged on the side positions of the rear seat of the vehicle when the air bag is developed and inflated. The front-seat inflation chamber 21 may be arranged on the side positions of the front seat when the air bag is developed and inflated. The gas passage 27 extends forwardly from the gas inflow part 13, and disposed above the front- and rear-seat inflation chambers 21 and 16, and allows inflation gas to flow into the front- and rear-seat inflation chambers. The gas passage 27 includes a rear passage 28, a front passage 29, and an intermediate passage 30. The rear passage 28 is disposed above the rear-seat inflation chamber 16. The front passage 29 is disposed above the front-seat inflation chamber 21. The intermediate passage 30 intercommunicates the rear passage 28 and the front passage 29 above a rectangular plate portion 42b to be described later.

The non-inflating section 33 is constructed coupling the cabin-inside side wall 15a and the cabin-outside side wall 15b. In the embodiment, it is constructed with the peripheral edge part 34, coupling parts 36 to 40, and a plate-like member 42. The peripheral edge part 34 surrounds the inflating section 15. Further, it includes a partitioning part 34a parting the space into the gas-inflow part 13 and the rear-seat inflation section 16.

The plate-like member 42 includes a triangular plate portion 42a provided on the front side of the main body 14, and a rectangular plate portion 42b provided under the intermediate passage 30 between the front and rear seat inflation parts 21 and 16. The plate-like member 42 defines an overall configuration of the main body 14 ranging from the gas-inflow parts 13 to the front end of the main body 14. Further, it reduces a time taken till the inflating operation ends.

The peripheral edge part 34 and the coupling parts 36 to 40, together with the mounting parts 12, are woven more densely than the plate-like member 42. The plate-like member 42 is coarsely woven because it is not located at the boundary of the inflating section 15 and hence there is no need of taking any measure for preventing the inflation gas from leaking. It is coarsely woven in two cloths, and those cloths are bonded together in a spot bonding manner. In the embodiment, such structural portions as the triangular plate portion 42a and the rectangular plate portion 42b are disposed in the vicinity of the mounting parts 12 on the upper edge 11a side and the gas inflow part 13, and under the peripheral edge part 34 right under the rear-seat inflation chamber 16 and the front-seat inflation chamber 21 of an air-bag lower fringe 11b.

The coupling parts 36 to 38 are T- or J- shaped while vertically extending within a region of the front-seat inflation section 21. Those parts are arranged side by side as viewed in the longitudinal direction of the vehicle, while being separated from the peripheral edge part 34. The coupling parts 39 and 40, shaped like an I, extend downward from the partitioning part 34a of the peripheral edge part 34 into a region of the rear-seat inflation section 16, while being arranged side by side as viewed in the longitudinal direction.

Coupling parts 36 to 40 are provided for making the thickness of the front and back seat inflation parts 21 and 16 uniform when the inflation gas flows into the inflating section 15 to inflate it. Further, those parts cause a structure ranging from a position near the gas-inflow parts 13 to the front part of the main body 14 to exhibit a tension. With this, even if such a pressing force as to press the main body 14 out of the vehicle acts on the main body 14, the main body 14 is immovable.

A plurality (four in the embodiment) of inflow ports 22 to 25 are formed in the front-seat inflation chamber 21. Those inflow ports allow inflation gas to flow from the front passage 29 of the gas passage 27 into the front-seat inflation chamber with the aid of the coupling parts 36 to 38. The inflow port 22 is opened at a position above and between the peripheral edge part 34 of the front end of the front-seat inflation chamber 21 and the coupling part 36. The inflow port 23 is opened above and between the coupling parts 36 and 37. The inflow port 24 is opened above and between the coupling parts 37 and 38. The inflow port 25 is opened above and between the coupling part 38 and the peripheral edge part 34 of the front-seat inflation chamber 21. Those inflow ports 22 to 25 are arranged such that the axial direction of those inflow ports are vertical and substantially orthogonal to an axial direction X2 (see FIGS. 3 and 6) of the front passage 29 of the gas passage 27, which is disposed in the front/rear direction (substantially horizontal).

In the embodiment, the inflow port 25 located at the rear end of the front-seat inflation chamber 21 is located at the position of a center pillar CP when the air bag 11 is mounted on the vehicle.

One inflow port 17 is bored in the upper part of the front side of the rear-seat inflation chamber 16. The inflow port 17 allows inflation gas to flow from the rear passage 28 of the gas passage 27 to the rear-seat inflation chamber. The axial direction of the opening of the inflow port 17 is vertical and substantially orthogonal to the axial direction X1 (FIGS. 3 and 4) of the rear passage 28 of the gas passage 27, which is disposed in the front/rear direction (substantially horizontal).

Figure 4:
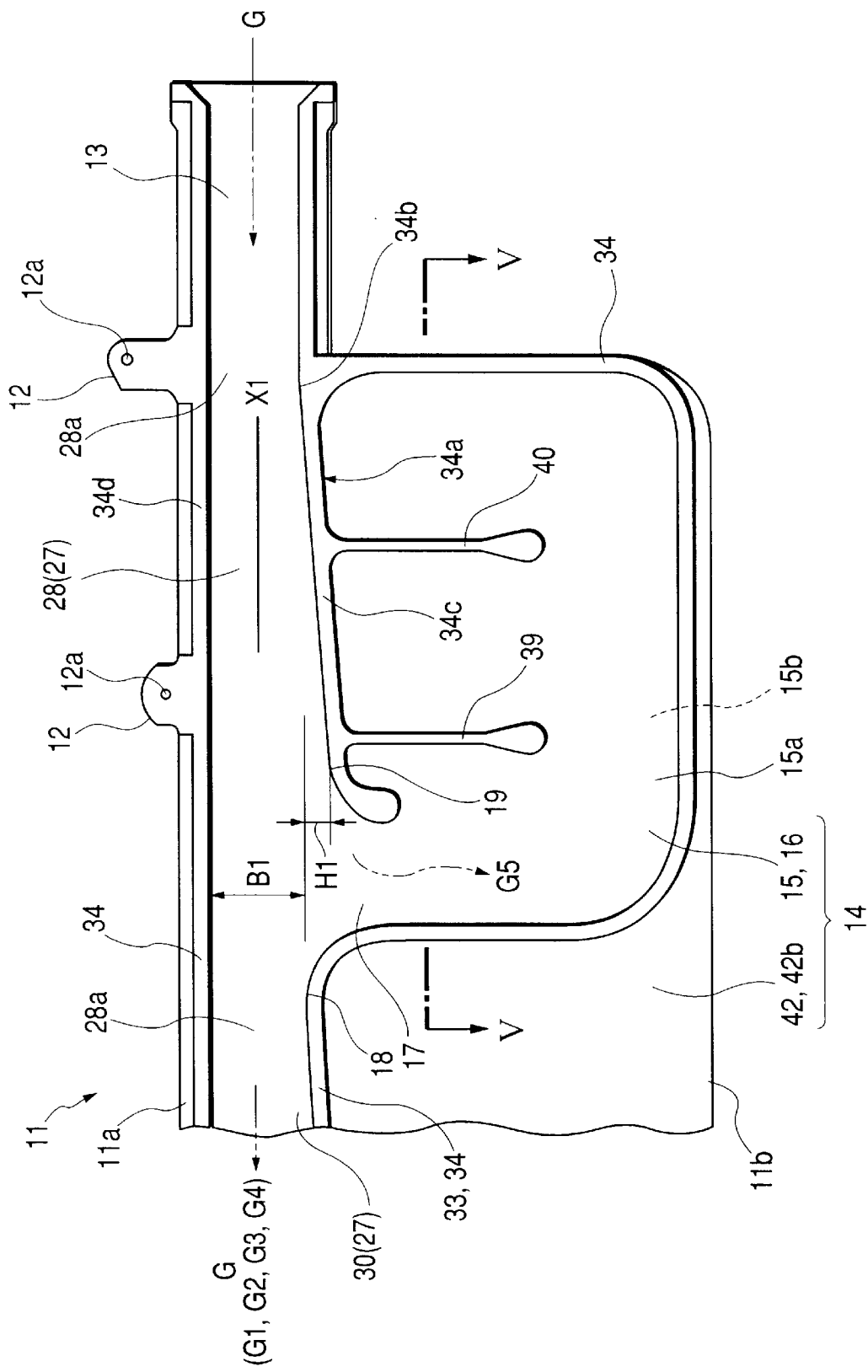
FIG. 4 is an enlarged, partial front view showing the rear end part of the air bag being developed flat.
Figure 5:
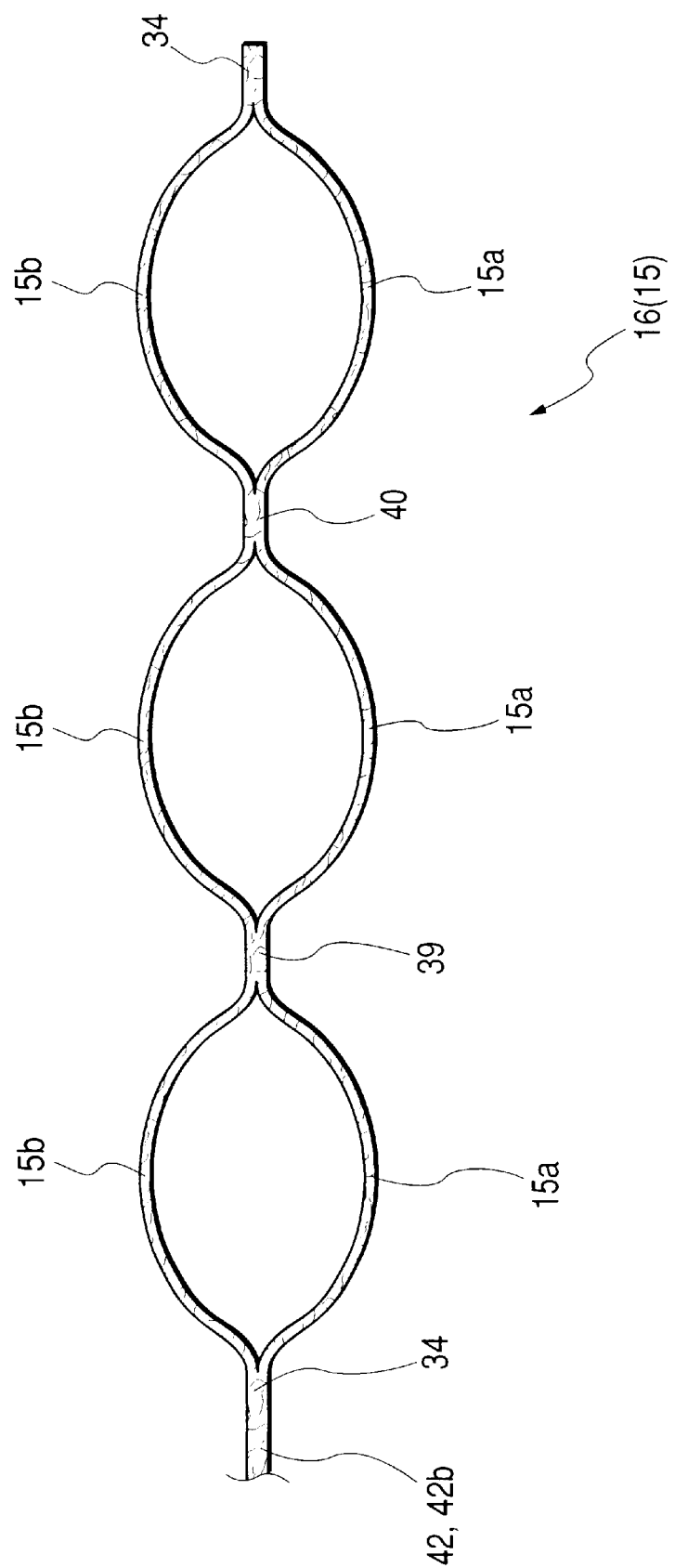
FIG. 5 is an enlarged, partial transverse cross sectional view showing the air bag being inflated, the view showing an area of the air bag taken on line V—V in FIG. 4.

The front-side peripheral edge 18 of the inflow port 17 of the rear-seat inflation chamber 16, as shown in FIG. 4, is higher than the rear-side peripheral edge 19 by a dimension of H1 (20 mm in the embodiment) in a state that the air bag 11 is developed flat.

The peripheral edge 18 of the inflow port 17 is positioned at the uppermost position of the peripheral edge part 34 which defines the front end of the rear-seat inflation chamber 16, and in the embodiment, it is on the same level with a beginning part 34b of the partitioning part 34a, which is closer to the gas inflow part 13. The rear-side peripheral edge 19 of the peripheral edge of the inflow port 17 is positioned at the fore end of a linear part 34c of the partitioning part 34a, which linearly slants downward from the beginning part 34b. In this embodiment, the peripheral wall of the rear passage 28 (an upper edge 34d of the peripheral edge) is linearly and horizontally extended. The partitioning part 34a forming the peripheral wall on the lower edge side of the rear passage 28 is configured such that the linear intermediate part 34c is extended obliquely and downwardly, and the rear passage 28 is expanded in diameter toward the front side. Accordingly, the front-side peripheral edge 18 is higher than the rear-side peripheral edge 19 by the dimension H1.

Figure 6:
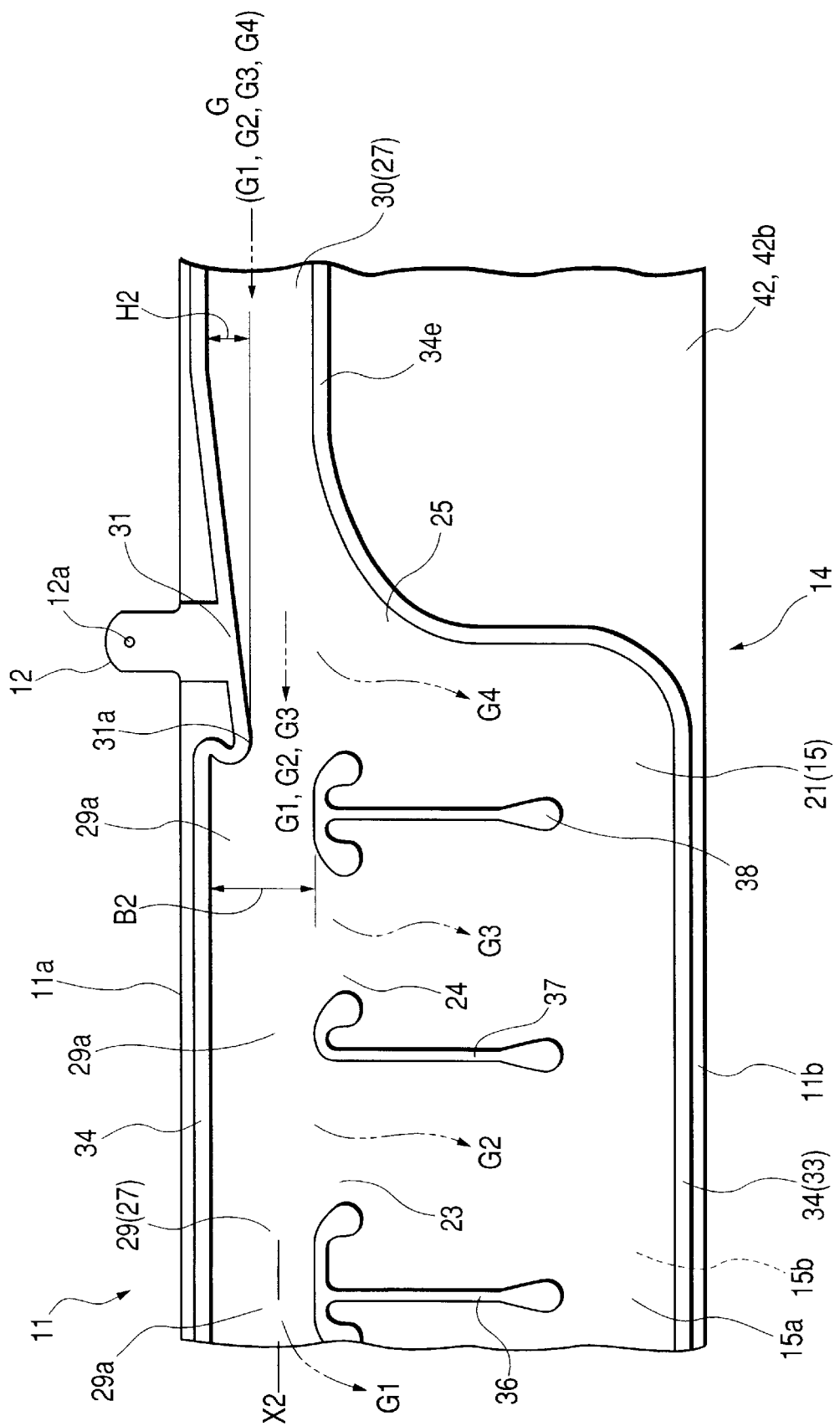
FIG. 6 is an enlarged, partial front view showing the front end part of the air bag being developed flat.

In the embodiment, as shown FIGS. 3 and 6, above the inflow port 25 on the rear side of the front-seat inflation chamber 21, a guide 31 is formed on the peripheral wall on the upper edge side of the front passage 29 of the gas passage 27. The guide 31 is configured such that the peripheral edge part 34 is gently inclined downward from the intermediate passage 30. The guide 31 is provided to positively direct downward part of the inflation gas flowing forward within the intermediate passage 30 and guide the gas from the inflow port 25 to the front-seat inflation chamber 21.

In the embodiment, a downward projection quantity H2 between the lower end 31a of the guide 31 and the peripheral wall of the intermediate passage 30 on the upper edge side is set at 30 mm.

The intermediate passage 30 is configured such that the lower peripheral wall is slanted downward more sharply than the guide 31 so as to increase its diameter to the front. In other words, the front end of a mid position 34e on the upper side of the rectangular plate portion 42b of the peripheral edge part 34, is greatly bent downwardly.

In the embodiment, as indicated by a two-dot chain line in FIG. 3, folding of the air bag is repeated in opposite directions and holding edges C are formed at the crests and troughs, whereby the air bag is formed like bellows acting so as to move the lower edge of the 11b to the upper edge 11a. In manufacturing the air bag 11, a base cloth is woven to have a predetermined pattern. Then, if required, it is processed to increase its heat resistance, and is coated with silicone or the like to form a coating layer thereon in order to prevent the inflation gas from being leaked. Incidentally, after the base cloth is woven, the coating layer is formed over the outer surface of the base cloth because it is impossible to coat its inner surface with coating material.

After being folded, the air bag is wrapped with a tape 44 which may be broken (FIGS. 1 and 2), in order to prevent its re-expansion. Then, the inflator 51 and the mounting brackets 46 to 48, and 52 are mounted on it, whereby an air bag assembly is formed. Tape 44, which may be broken, is further applied to the areas of the mounting brackets 47 and 48 so as to prevent those mounting brackets 47 and 48 from separating from the air bag 11.

The mounting brackets 46 to 48 and 52 are located at predetermined positions of the inner panel 2; The mount holes 12a or the like are passed therethrough and fastened by bolts 49 and 53; and the mounting brackets 46 to 48 and 52 are fastened to the inner panel 2, whereby the air bag assembly is mounted to the vehicle body 1. Thereafter, the pillar garnish 4 and the roof head lining 5 are attached to the vehicle body 1. Further, a rear pillar garnish 6 and a center pillar garnish 7 are attached to the vehicle body 1. Here, the air bag 11, together with the head protection air bag device M, has been mounted on the vehicle.

In operation, the head protection air bag device M is mounted on the vehicle, and the inflator 51 is operated. An inflation gas G output from the inflator 51 flows from the gas-inflow parts 13 and through the gas passage 27, i.e., the rear passage 28, the intermediate passage 30 and the front passage 29 in this order. The gas flows out of the inflow ports 22 to 25 in the form of branch streams G1 to G4 of the gas, and reaches the front-seat inflation chamber 21. A branch stream G5 of the gas flows out of the inflow port 17 and into the rear-seat inflation chamber 16. The inflating section 15 starts to inflate while coming out of its folded state. The air bag 11 breaks the tape 44 with which the air bag is wrapped; forcibly opens the pillar garnish 4 and the air bag cover 9 on the lower edge side of the roof head lining 5; and inflates so as to cover the opening W and the cabin-inside side of the rear pillar RP, while projecting downwardly.

In the present embodiment, the inflow port 17 of the rear-seat inflation chamber 16 is opened to the gas passage 27 of the air bag 11 in the direction substantially orthogonal to the axial direction X1 of the gas passage 27 (rear passage 28), which is disposed in the front/rear direction. The front-side peripheral edge 18 of the inflow port is lower than the rear-side peripheral edge 19 by the dimension H1. Accordingly, the front-side peripheral edge 18 of the inflow port 17 may interfere with the inflation gas G by an extent corresponding to the dimension H1 by which the front-side peripheral edge 18 is higher than the rear-side peripheral edge 19. The front-side peripheral edge directs the inflation gas G5 resulting from the interference to the rear-seat inflation chamber 16. This leads to a quick start of the developing/inflating operation of the rear-seat inflation chamber 16.

The inflow port 17 of the rear-seat inflation chamber 16 has a configuration such that it is opened in the direction substantially orthogonal to the axial direction X1 of the gas passage 27 (rear passage 28), and its front-side peripheral edge 18 is higher than its rear-side peripheral edge 19. Such a configuration of the inflow port cannot direct all of the inflation gas G flowing forwardly within the gas passage 27 to the rear-seat inflation chamber 16. Therefore, a delay of the completion of the developing/inflating operation of the front-seat inflation chamber 21 may be minimized by appropriately adjusting a height of the front-side peripheral edge 18 from the rear-side peripheral edge 19.

Accordingly, the air bag 11 of the embodiment which is used for the head protection air bag device M is capable of minimizing the delay of the completion of the developing/inflating operation of the front-seat inflation chamber 21, and quickly starting the developing/inflating operation of the rear-seat inflation chamber 16.

The dimension H1 of the front-side peripheral edge 18 of the inflow port 17 of the rear-seat inflation chamber 16 from the rear-side peripheral edge 19 is preferably 15 to 40% of the dimension B1 of the opening of a general portion 28a (front-side peripheral edge 18 or beginning part 34b) of the rear passage 28 in a state that the air bag 11 developed flat. If the height H1 is smaller than 15%, the effect of securing the quick start of the developing/inflating operation of the rear-seat inflation chamber 16 is lessened. If it is in excess of 40%, its interference with the inflation gas G flowing to the front-seat inflation chamber 21 is large. As a result, there is a danger of delaying the completion of the developing/inflating operation of the front-seat inflation chamber 21.

In the air bag 11 of the present embodiment, the front-seat inflation chamber 21 is opened in the direction substantially orthogonal to the axial direction X2 of the gas passage 27 (front passage 29). A plurality of inflow ports 22 to 25 is arrayed along the front passage 29 of the gas passage 27.

Provided above the inflow port 25 on the rear side is the guide 31 for directing downwardly branch stream G4 of the inflation gas G flowing forwardly and guiding the gas from the inflow port 25 on the rear side into the front-seat inflation chamber 21.

The inflation gas G flows forwardly through the rear passage 28 above the front-seat inflation chamber 21 and to the front side of the intermediate passage 30. When the inflation gas G flows to the upper part of the front-seat inflation chamber 21, branch stream G4 of the inflation gas G flowing forwardly is directed downwardly by the guide 31, and guided into the front-seat inflation chamber 21, from the inflow port 25 on the rear side. As a result, the developing/inflating operation of the front-seat inflation chamber 21 is quickly started.

Also in this case, the branch streams G1 to G3 of the inflation gas G may smoothly be introduced from the inflow ports 22 to 24 into the front-seat inflation chamber 21 on the front side of the inflow port 25 by appropriately adjusting the downward projection quantity H2 of the guide 31. As a result, the front-seat inflation chamber 21 being folded is developed downwardly from the substantially entire region as viewed in the front/rear direction. This facilitates completion of the developing/inflating operation of the front-seat inflation chamber 21.

The quantity H2 of the downward projection of the lower end 31a of the guide 31 from the intermediate passage 30 is preferably 20 to 50% of the opening dimension B2 of a general portion 29a (portion of the upper end of the coupling parts 36 to 38) of the front passage 29. If it is smaller than 20%, the effect of securing the quick start of the developing/inflating operation of the rear-seat inflation chamber 16 is less affected. If it is in excess of 50%, its interference with the inflation gas G flowing to the front side of the front-seat inflation chamber 21 is large. As a result, there is a danger of delaying the completion of the developing/inflating operation of the front-seat inflation chamber 21.

Figure 7:
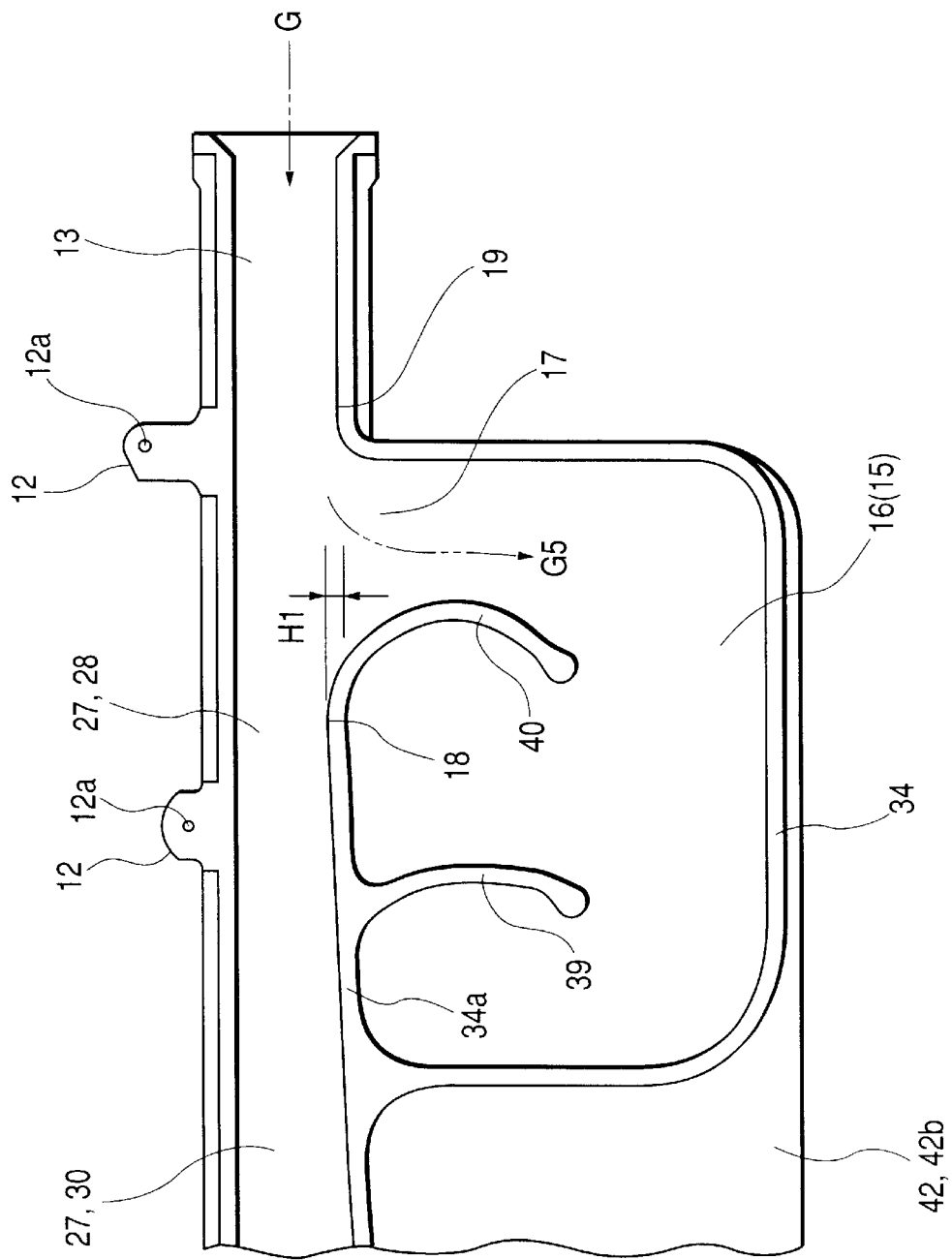
FIG. 7 is a partial, front view showing an air bag which is another embodiment of the present invention.

In the above-mentioned embodiment, the inflow port 17 of the rear-seat inflation chamber 16 is located on the front side thereof. If required, the inflow port 17 may be located on the rear side of the rear-seat inflation chamber 16 as shown in FIG. 7. Also in this case, the front-side peripheral edge 18 of the peripheral edge of the opening of the inflow port 17 is selected to be higher than the rear-side peripheral edge 19 by the height H1.

In the embodiment mentioned above, the coupling parts 39 and 40 of the rear-seat inflation chamber 16 are linearly and vertically extended. In an alternative embodiment, coupling parts 39 and 40 may be extended vertically while being curved, as shown in FIG. 7. The same thing is true for the coupling parts 36 to 38 within the front-seat inflation chamber 21.

In one embodiment, a hollow weave air bag is used for the air bag 15. The air bag may be formed by stitching, adhering using adhesive, welding using high frequency welder or another suitable process. In this case, the invention may be applied to the configuration of the peripheral edge of the inflow port.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. An air bag in use for a head protection air bag device in which said air bag, while being folded, is stored in an upper fringe of openings on a cabin-inside side of a vehicle, said air bag comprising:

a gas inflow part for flowing inflation gas;

a gas passage extending forwardly from said gas inflow part;

a front-seat inflation chamber located at a position near a side of a front seat for receiving the inflation gas;

a rear-seat inflation chamber located at a position near a side of a rear seat for receiving the inflation gas, said front- and rear-seat inflation chambers being disposed below said gas passage through respective inflow ports formed in upper parts of said front- and rear-seat inflation chambers to allow the inflation gas to flow into said front- and rear-seat inflation chambers; and a partitioning part dividing said gas passage from said rear-seat inflation chamber to thereby define said inflow port of said rear-seat inflation chamber, said partitioning part comprising a beginning part and a linear part linearly slanting downwardly from said beginning part in a frontward direction and a rear-side peripheral edge of said inflow port of said rear-seat inflation chamber is positioned at a forward end of said linear part;

wherein said inflow port of said rear-seat inflation chamber is opened in a direction substantially orthogonal to an axial direction of said gas passage, and a front-side peripheral edge of said inflow port is disposed to be higher than said rear-side peripheral edge of said inflow port.

2. An air bag in use for a head protection air bag device according to claim 1, wherein said front-side peripheral edge of said inflow port is higher than said rear-side peripheral edge of said inflow port by a dimension of 20 mm.

3. An air bag in use for a head protection air bag device according to claim 1, wherein a height dimension of said front-side peripheral edge of said inflow port from said rear-side peripheral edge of said inflow port is in a range of 15 to 40% of a height dimension of said gas passage.

4. An air bag in use for a head protection air bag device according to claim 1, further comprising a guide formed on an upper peripheral wall of said gas passage located above an inflow port of said front-seat inflation chamber such that the upper peripheral part is gradually projected downwardly in a frontward direction and wherein said guide is for deflecting the inflation gas passing through said gas passage downwardly and for directing the inflation gas toward said inflow port of said front-seat inflation chamber and wherein said inflow port of said front-seat inflation chamber is located adjacent to a center pillar.

5. An air bag in use for a head protection air bag device according to claim 4, wherein a projection quantity between a lower end of said guide and said upper peripheral wall of said gas passage is set at 30 mm.

6. An air bag in use for a head protection air bag device according to claim 4, wherein a projection quantity between a lower end of said guide and said upper peripheral wall of said gas passage is in a range of 20 to 50% of a height dimension of said gas passage.

7. An air bag in use for a head protection air bag device in which said air bag, while being folded, is stored in an upper fringe of openings on a cabin-inside side of a vehicle, said air bag comprising:

a gas inflow part for flowing inflation gas;

a gas passage extending forwardly from said gas inflow part;

a front-seat inflation chamber located at a position near a side of a front seat for receiving the inflation gas; and a rear-seat inflation chamber located at a position near a side of a rear seat for receiving the inflation gas, said front- and rear-seat inflation chambers being disposed below said gas passage through respective inflow ports formed in upper parts of said front- and rear-seat inflation chambers to allow the inflation gas to flow into said front- and rear-seat inflation chambers; and a guide formed on an upper peripheral wall of said gas passage located above an inflow port of said front-seat inflation chamber such that the upper peripheral wall is gradually projected downwardly in a frontward direction, the guide terminating at or closely adjacent to the inflow port, wherein said guide is for deflecting the inflation gas passing through said gas passage downwardly and for directing the inflation gas toward said inflow port of said front-seat inflation chamber and wherein said inflow port of said front-seat inflation chamber is located adjacent to a center pillar.

8. An air bag in use for a head protection air bag device according to claim 7, wherein a projection quantity between a lower end of said guide and said upper peripheral wall of said gas passage is set at 30 mm.

9. An air bag in use for a head protection air bag device according to claim 7, wherein a projection quantity between a lower end of said guide and said upper peripheral wall of said gas passage is in a range of 20 to 50% of a height dimension of said gas passage.

10. An air bag in use for a head protection air bag device according to claim 7, wherein said inflow port of said rear-seat inflation chamber is opened in a direction substantially orthogonal to an axial direction of said gas passage, and a front-side peripheral edge of said inflow port of said rear-seat inflation chamber is disposed to be higher than a rear-side peripheral edge of said inflow port of said rear-seat inflation chamber.

11. An air bag in use for a head protection air bag device according to claim 10, wherein said front-side peripheral edge of said inflow port of said rear-seat inflation chamber is higher than said rear-side peripheral edge of said inflow port of said rear-seat inflation chamber by a dimension of 20 mm.

12. An air bag in use for a head protection air bag device according to claim 10, wherein a height dimension of said front-side peripheral edge of said inflow port of said rear-seat inflation chamber from said rear-side peripheral edge of said inflow port of said rear-seat inflation chamber is in a range of 15 to 40% of a height dimension of said gas passage.

13. An air bag in use for a head protection air bag device according to claim 10, further comprising a partitioning part parting said gas passage from said rear-seat inflation chamber to thereby define said inflow port of said rear-seat inflation chamber, said partitioning part comprising a beginning part and a linear part linearly slanting downwardly from said beginning part in a frontward direction and said rear-side peripheral edge of said inflow port of said rear-seat inflation chamber is positioned at a forward end of said linear part.

14. An air bag in use for a head protection air bag device according to claim 10, further comprising a partitioning part dividing said gas passage from said rear-seat inflation chamber to thereby define said inflow port of said rear-seat inflation chamber, said partitioning part comprising a beginning part and a linear part linearly slanting downwardly from said beginning part in a rearward direction and said front-side peripheral edge of said inflow port of said rear-seat inflation chamber is positioned at a forward end of said linear part.

* * * * *